(12) United States Patent
Bliss et al.

(10) Patent No.: US 10,332,002 B2
(45) Date of Patent: Jun. 25, 2019

(54) METHOD AND APPARATUS FOR PROVIDING TRAILER INFORMATION

(71) Applicants: GM GLOBAL TECHNOLOGY OPERATIONS LLC, Detroit, MI (US); Board of Trustees of Michigan State University, East Lansing, MI (US)

(72) Inventors: Michael Bliss, Troy, MI (US); Yunfei Zhang, Whitby (CA); Xiaoming Liu, Okemos, MI (US); Yousef Atoum, Lansing, MI (US); Joseph Roth, Pittsburgh, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 15/470,159

(22) Filed: Mar. 27, 2017

(65) Prior Publication Data
US 2018/0272941 A1   Sep. 27, 2018

(51) Int. Cl.
| | |
|---|---|
| B60D 1/36 | (2006.01) |
| B60D 1/62 | (2006.01) |
| G06K 9/00 | (2006.01) |
| G06K 9/46 | (2006.01) |
| G06N 3/08 | (2006.01) |
| G06T 7/73 | (2017.01) |
| B62D 15/02 | (2006.01) |

(52) U.S. Cl.
CPC .............. *G06N 3/08* (2013.01); *B60D 1/36* (2013.01); *B60D 1/62* (2013.01); *B62D 15/0295* (2013.01); *G06K 9/00791* (2013.01); *G06K 9/4604* (2013.01); *G06K 9/4628* (2013.01); *G06T 7/74* (2017.01); *B60R 2300/808* (2013.01); *G06T 2207/30252* (2013.01)

(58) Field of Classification Search
CPC ..... B60R 1/003; B60R 1/00; B60R 2300/808; B60R 2300/50; B60R 2300/302; B60R 2300/80; B62D 15/0295; B62D 15/0285; B62D 15/025; G06T 7/74; G06T 7/33; G06T 7/12–13; G06T 2207/30252; G06T 2207/30204; G06K 9/4604; G06K 9/00791; G06N 3/08; B60D 1/36; B60D 1/62; B60D 1/06
See application file for complete search history.

(56) References Cited

U.S. PATENT DOCUMENTS

| | | | | |
|---|---|---|---|---|
| 8,896,699 | B2 * | 11/2014 | Kasuga | .................. H04N 7/181 |
| | | | | 348/118 |
| 9,085,261 | B2 * | 7/2015 | Lu | .......................... B60D 1/245 |

(Continued)

OTHER PUBLICATIONS

"Monocular Video-Based Trailer Coupler Detection Using Multiplexer Convolutional Neural Network"; Yousef Atoum ; Joseph Roth ; Michael Bliss ; Wende Zhang ; Xiaoming Liu; 2017 IEEE International Conference on Computer Vision (ICCV) (Year: 2017).*

*Primary Examiner* — Michael S Osinski

(57) ABSTRACT

A method and apparatus for providing trailer information are provided. The method includes detecting a p coupler of the trailer in the image of the rear-facing camera; detecting a position of the coupler in the received image; and determining a distance between the detected position of the coupler of the trailer and a hitch of vehicle. The method may be use to display information about a trailer coupler or guide a vehicle to line up a vehicle hitch to a trailer coupler.

17 Claims, 4 Drawing Sheets

(56) References Cited

U.S. PATENT DOCUMENTS

| | | | |
|---|---|---|---|
| 9,499,018 B2* | 11/2016 | Gehrke | B60D 1/36 |
| 9,731,568 B2* | 8/2017 | Wuergler | B60D 1/36 |
| 9,798,953 B2* | 10/2017 | Hu | G06K 9/6202 |
| 9,896,130 B2* | 2/2018 | Ghneim | B62D 13/06 |
| 9,914,333 B2* | 3/2018 | Shank | B60D 1/58 |
| 9,934,572 B2* | 4/2018 | Hu | G06T 7/12 |
| 9,950,738 B2* | 4/2018 | Lu | B60D 1/245 |
| 10,017,115 B2* | 7/2018 | Lavoie | B60R 1/00 |
| 10,046,803 B2* | 8/2018 | Singh | B62D 13/06 |
| 2002/0145663 A1* | 10/2002 | Mizusawa | B60D 1/36 348/118 |
| 2005/0074143 A1* | 4/2005 | Kawai | B60D 1/36 382/104 |
| 2006/0038381 A1* | 2/2006 | Gehring | B60D 1/36 280/477 |
| 2006/0255560 A1* | 11/2006 | Dietz | B60D 1/36 280/477 |
| 2009/0271078 A1* | 10/2009 | Dickinson | G06K 9/3241 701/51 |
| 2011/0216199 A1* | 9/2011 | Trevino | B60D 1/36 348/148 |
| 2013/0107055 A1* | 5/2013 | Kasuga | H04N 7/181 348/148 |
| 2013/0226390 A1* | 8/2013 | Luo | B60D 1/36 701/25 |
| 2014/0069193 A1* | 3/2014 | Graham | G01N 29/04 73/584 |
| 2014/0114529 A1* | 4/2014 | An | B62D 15/028 701/36 |
| 2014/0125795 A1* | 5/2014 | Yerke | B60R 1/00 348/118 |
| 2014/0152774 A1* | 6/2014 | Wakabayashi | G08G 1/168 348/46 |
| 2014/0200759 A1* | 7/2014 | Lu | B60D 1/245 701/28 |
| 2014/0358429 A1* | 12/2014 | Shutko | G01C 21/3647 701/458 |
| 2015/0115571 A1* | 4/2015 | Zhang | B60D 1/06 280/477 |
| 2015/0217693 A1* | 8/2015 | Pliefke | B60R 1/00 348/118 |
| 2015/0251697 A1* | 9/2015 | Lavoie | B62D 13/06 701/523 |
| 2016/0129939 A1* | 5/2016 | Singh | B62D 13/06 701/41 |
| 2016/0288601 A1 | 10/2016 | Gehrke et al. | |
| 2017/0050567 A1* | 2/2017 | Bochenek | B60R 1/003 |
| 2017/0151846 A1* | 6/2017 | Wuergler | B60D 1/36 |
| 2017/0174128 A1* | 6/2017 | Hu | B60R 1/00 |
| 2017/0177949 A1* | 6/2017 | Hu | G06K 9/00791 |
| 2017/0177973 A1* | 6/2017 | Hu | G06K 9/6202 |
| 2017/0178328 A1* | 6/2017 | Hu | G06T 7/12 |
| 2017/0262727 A1* | 9/2017 | Kozuka | G06K 9/4604 |
| 2017/0280091 A1* | 9/2017 | Greenwood | B60R 1/00 |
| 2017/0334413 A1* | 11/2017 | Murakoshi | B60R 1/00 |
| 2018/0001721 A1* | 1/2018 | Huger | G05D 1/0246 |
| 2018/0251153 A1* | 9/2018 | Li | B62D 13/06 |
| 2018/0253106 A1* | 9/2018 | Inui | G05D 1/0246 |
| 2018/0308364 A1* | 10/2018 | Kume | B60R 21/00 |
| 2018/0361929 A1* | 12/2018 | Zhang | B60R 1/00 |

* cited by examiner

METHOD AND APPARATUS FOR PROVIDING TRAILER INFORMATION

INTRODUCTION

Apparatuses and methods consistent with exemplary embodiments relate to detecting trailers and providing information about trailers. More particularly, apparatuses and methods consistent with exemplary embodiments relate to trailer coupler detection and distance estimation.

SUMMARY

One or more exemplary embodiments provide a method and an apparatus that detect a coupler of a trailer and provide information on the trailer coupler based on image analysis. More particularly, one or more exemplary embodiments provide a method and an apparatus that detect a coupler of a trailer, estimate a position of the coupler, determine a distance between the coupler and a vehicle, and provide guidance to guide a vehicle to the coupler.

According to an aspect of an exemplary embodiment, a method for providing trailer coupler information is provided. The method includes: receiving an image taken by a rear-facing camera; identifying a coupler of a trailer in the received image; detecting a positon of the identified coupler in the received image; determining a distance between the detected position of the coupler of the trailer and a hitch of vehicle; and displaying at least one from among information on the determined distance, information on the detected position of the coupler of the trailer, and information to guide a vehicle to the coupler.

The identifying the coupler may include detecting coordinates of the coupler by using a convolutional neural network for identifying a coupler, and the detecting the position of the coupler of the trailer may include: generating N random patches; and testing the N random patches using a plurality of convolutional neural networks to estimate the position of the coupler of the trailer.

The plurality of convolutional neural networks may include a first convolutional neural network corresponding to a first distance that is closest to the rear-facing camera, a second convolutional neural network corresponding to a second distance that is further away from the rear-facing camera than the first distance, and a third convolutional neural network corresponding to a third distance that is in between the first distance and second distance.

The detecting the position of the coupler of the trailer in the image may further include: estimating contour points of the coupler in the image; determining a geometry of the coupler; based on the contour points and the geometry, determining a height of the coupler.

The estimating contour points of the coupler may include determining two-dimensional coordinates of edges of the coupler using a convolutional neural network for detecting a contour of a coupler.

The method may further include determining an absolute position of the coupler based on the height and two-dimensional coordinates of the edges of the coupler.

The method may further include receiving a user input to adjust the position of the coupler of the trailer in the image, and based on the user input, re-detecting the position of the coupler of the trailer in the image.

The method may further include controlling to guide the vehicle to the coupler based on at least one from among the information on the determined distance and the information on the detected position of the coupler of the trailer.

According to an aspect of another exemplary embodiment, an apparatus for providing trailer coupler information is provided. The apparatus includes: at least one memory comprising computer executable instructions; and at least one processor configured to read and execute the computer executable instructions. The computer executable instructions cause the at least one processor to: receive an image taken by a rear-facing camera; identify a coupler of a trailer in the received image; detect a position of the identified coupler of the trailer in the received image; determine a distance between the detected position of the coupler of the trailer and a hitch of vehicle; and control to display at least one from among information on the determined distance, information on the detected position of the coupler of the trailer, and information to guide a vehicle to the coupler.

The computer executable instructions may cause the at least one processor to identify the coupler by detecting coordinates of the coupler by using a convolutional neural network for identifying a coupler, and may also cause the at least one processor to detect the position of the coupler of the trailer by generating N random patches and testing the N random patches using a plurality of convolutional neural networks to estimate the position of the coupler.

The plurality of convolutional neural networks may include a first convolutional neural network corresponding to a first distance that is closest to the rear-facing camera, a second convolutional neural network corresponding to a second distance that is further away from the rear-facing camera than the first distance, and a third convolutional neural network corresponding to a third distance that is in between the first distance and second distance.

The computer executable instructions may cause the at least one processor to detect the position of the coupler of the trailer in the image by estimating contour points of the coupler in the image, determining a geometry of the coupler, and based on the contour points and the geometry, determining a height of the coupler.

The computer executable instructions may cause the at least one processor to estimate contour points of the coupler by determining two-dimensional coordinates of edges of the coupler using a convolutional neural network for detecting a contour of a coupler.

The computer executable instructions may cause the at least one processor to determine an absolute position of the coupler based on the height and two-dimensional coordinates of the edges of the coupler.

The computer executable instructions may further cause the at least one processor to receive a user input to adjust the position of the coupler of the trailer in the image; and based on the user input, re-detect the position of the coupler of the trailer in the image.

The computer executable instructions may cause the at least one processor to control to guide the vehicle to the coupler based on at least one from among the information on the determined distance and the information on the detected position of the coupler of the trailer.

According to an aspect of another exemplary embodiment, a non-transitory computer readable medium comprising computer instructions executable by a processor is provided. The computer instructions are executable perform a method including detecting a position of a coupler of a trailer in an image taken by a rear-facing camera by using a convolutional neural network, and determining a distance between the detected position of the coupler of the trailer and a hitch of vehicle.

The detecting the position of the trailer may include detecting coordinates of the coupler of the trailer by using the convolutional neural network for identifying the coupler, generating N random patches, and testing the N random patches using a plurality of convolutional neural networks to estimate the position of the coupler.

The method may further include performing at least one from among: controlling to guide the vehicle to the coupler based on at least one from among the information on the determined distance and the information on the detected position of the coupler of the trailer; and displaying at least one from among information on the determined distance, information the detected position of the coupler of the trailer, and information to guide a vehicle to the coupler.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
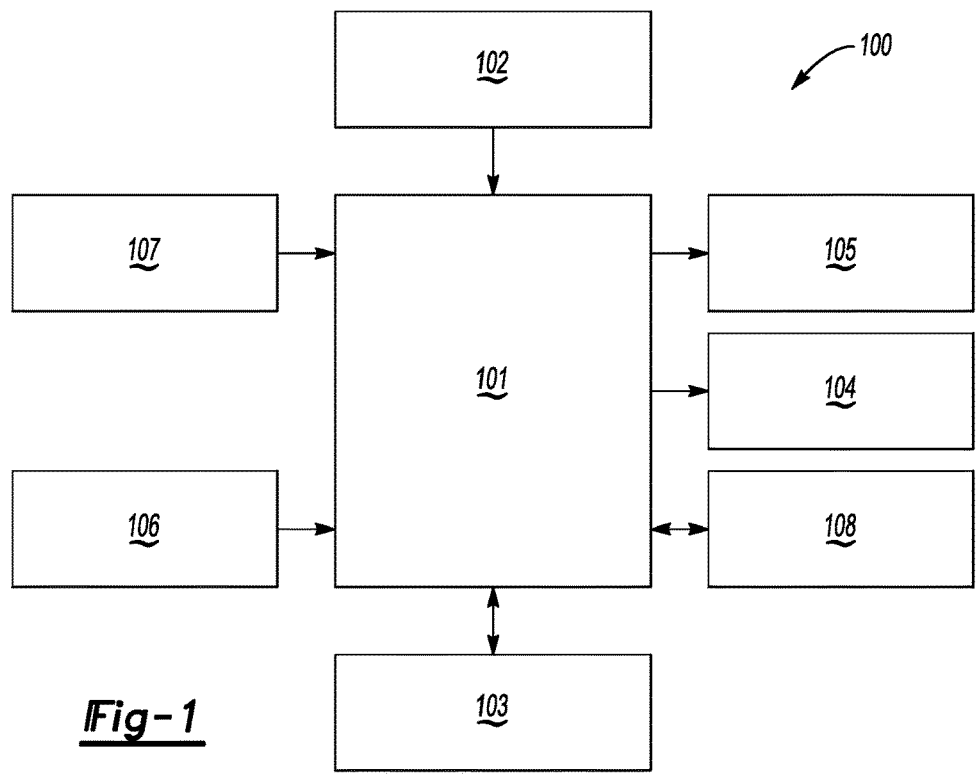
FIG. 1 shows a block diagram of an apparatus that provides trailer information according to an exemplary embodiment.

An apparatus and method that provide trailer information will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks include trailer hitches that serve as attachment points for trailers that may be towed by a vehicle. In order to attach a trailer to a vehicle, an operator of a vehicle must guide the vehicle to a position where the vehicle hitch is close enough to the attachment point on the trailer. However, guiding a vehicle to the attachment point or coupler of a trailer may prove difficult due to the limited view of the area behind the vehicle provided to the operator of the vehicle.

To address the above issue, operators of a vehicle may manually attempt to guide the vehicle to the attachment point of the trailer, get out of the vehicle and visually inspect the distance between the hitch and the coupler, adjust the position of the vehicle, and repeat, until the vehicle hitch can be connected to the attachment point of the trailer. Alternatively, a second person standing outside of the vehicle may guide the operator of the vehicle to the attachment point of the trailer. However, both of these approaches may be inconvenient for the operator of the vehicle. Thus, a method and apparatus that provides trailer information using a vehicle camera to perform vehicle guidance and that display visual assistance to an operator of vehicle may address the above issues.

FIG. 1 shows a block diagram of an apparatus that provides trailer information 100 according to an exemplary embodiment. As shown in FIG. 1, the apparatus that provides trailer information 100, according to an exemplary embodiment, includes a controller 101, a power supply 102, a storage 103, an output 104, a vehicle steering controller 105, a user input 106, a rear-facing camera 107, and a communication device 108. However, the apparatus that provides trailer information 100 is not limited to the aforementioned configuration and may be configured to include additional elements and/or omit one or more of the aforementioned elements. The apparatus that provides trailer information 100 may be implemented as part of a vehicle, as a standalone component, as a hybrid between an on vehicle and off vehicle device, or in another computing device.

The controller 101 controls the overall operation and function of the apparatus that provides trailer information 100. The controller 101 may control one or more of a storage 103, an output 104, a vehicle steering controller 105, a user input 106, a rear-facing camera 107, and a communication device 108 of the apparatus that provides trailer information 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle steering controller 105, the user input 106, the rear-facing camera 107, and the communication device 108 of the apparatus that provides trailer information 100. The information may be sent and received via a bus or network, or may be directly read or written to/from one or more of the storage 103, the output 104, the user input 106, the rear-facing camera 107, and the communication device 108 of the apparatus that provides trailer information 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle steering controller 105, the user input 106, the rear-facing camera 107, and the communication device 108, of the apparatus that provides trailer information 100. The power supply 102 may include one or more from among a battery, an outlet, a capacitor, a solar energy cell, a generator, a wind energy device, an alternator, etc.

The storage 103 is configured for storing information and retrieving information used by the apparatus that provides trailer information 100. The storage 103 may be controlled by the controller 101 to store and retrieve information from the rear-facing camera 107, the communication device 108, the user input 106, or the vehicle steering controller 105. The information may include information on a trailer detected by the rear-facing camera 107, information on a position of a trailer coupler, and/or guidance information to guide a vehicle to a trailer. In addition, the storage may store image information provided by rear-facing camera 107 that is analyzed to determine whether a position of a trailer, a position of a trailer coupler and/or a type of trailer. The storage 103 may also include the computer instructions configured to be executed by a processor to perform the functions of the apparatus that provides trailer information 100.

The storage 103 may also store a plurality of convolutional neural networks (CNNs) including a first convolutional neural network corresponding to a first distance that is closest to the rear-facing camera, a second convolutional neural network corresponding to a second distance that is further away from the rear-facing camera than the first distance, and a third convolutional neural network corresponding to a third distance that is in between the first distance and second distance. According to an example, the convolutional neural networks are used for identifying the position of a trailers coupler.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that provides trailer information 100. The output 104 may include one or more from among a speaker, an audio output device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of a position of a trailer, information showing how to guide a vehicle to a trailer coupler, and/or information indicating a distance between a vehicle and a trailer. In addition, the output 104 may output an image from the rear of a vehicle showing the bed of the vehicle, the hitch of the vehicle, and/or a trailer to which the vehicle is attempting to hitch.

The vehicle steering controller 105 may receive information corresponding to position of the trailer coupler and/or commands to guide the vehicle to the position of the trailer coupler. The vehicle steering controller may then issue commands to guide the vehicle in order to align the vehicle hitch with the trailer coupler based on the information corresponding to position of the trailer coupler and/or the commands to guide the vehicle to the position of the trailer.

The user input 106 is configured to provide information and commands to the apparatus that provides trailer information 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a steering wheel, a mouse, a touchpad, etc.

The user input 106 may be configured to receive a user input to acknowledge or dismiss the notification output by the output 104. The user input 106 may also be configured to receive a user input to activate a trailer detection algorithm or the apparatus that prevents a collision with a gate of a vehicle 10. For example, the setting to turn the system on or off may be selected by an operator via user input 106. According to another example, the user input may be a steering wheel that provides steering angle information used to determine the trajectory of a vehicle and provide guidance information to adjust the trajectory of the vehicle to an operator of the vehicle.

The user input 106 may also be configured to receive a user input to adjust the position of the coupler of the trailer in the image. For example, if a box displayed on the screen represents the identified position of the coupler in an image, a user may move the box by performing a gesture through the user input or by selection of buttons or other input devices to select an actual position of the coupler. The controller 101 may then perform an algorithm to re-identifying the position of the coupler of the trailer in the image based on the user selection or input.

The rear-facing camera 107 may include one or more from among a plurality of sensors including a camera, an infrared camera, a LIDAR, a thermal imaging camera, etc. The rear-facing camera 107 may provide one or more images that may be analyzed to identify a coupler of a trailer and determine the positon of the coupler of the trailer. The one or more images may also be used to guide an operator of the vehicle to a coupler of the trailer or to control the vehicle to align it with the coupler of the trailer.

The communication device 108 may be used by apparatus that provides trailer information 100 to communicate with various types of external apparatuses according to various communication methods. The communication device 108 may be used to send/receive information on a trailer, information on whether a vehicle gate is open or closed, and/or vehicle dynamic information such as velocity, acceleration, etc., location information and/or information on whether a vehicle is in a hitching mode to/from the controller 101 of the apparatus that provides trailer information 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

The controller 101 of the apparatus that provides trailer information 100 may be configured to receive an image taken by a rear-facing camera, identify a coupler of a trailer in the image of the rear-facing camera, detect a position of the identified coupler, determine a distance between the detected position of the coupler of the trailer and a hitch of vehicle, and control to display at least one from among information on the determined distance, information on the detected position of the coupler of the trailer, and information to guide a vehicle to the coupler.

The controller 101 of the apparatus that provides trailer information 100 may be configured to identify the coupler of the trailer in the image by using a convolutional neural network for identifying a coupler.

The controller 101 of the apparatus that provides trailer information 100 may be configured to identify coupler by analyzing an image, identifying the coupler in the analyzed image and outputting a confidence score corresponding to the identified coupler. The imaged may be analyzed by generating patches (e.g., sub-samples of an image) based on an estimated distance between a rear-facing camera and a coupler.

The controller 101 of the apparatus that provides trailer information 100 may also be configured to detect the position of the coupler of the trailer by generating N random patches and testing the N random patches using a plurality of convolutional neural networks to estimate the position of the coupler of the trailer.

The controller 101 of the apparatus that provides trailer information 100 may be configured to detect the position of the coupler of the trailer in the image by estimating contour points of the coupler in the image using a convolutional neural network to estimate the contour of the coupler, determining a geometry of the coupler, and based on the contour points and the geometry, determining a height of the coupler. According to an example, the height of the coupler may be determined by extracting geometric features such as distances along straight lines and slopes of lines.

The controller 101 may also be configured to estimate contour points of the coupler by determining two-dimensional coordinates of edges of the coupler and update the position of the coupler based on the height and two-dimensional coordinates of the edges of the coupler using a convolutional neural network for detecting a contour of a coupler. The updating of the position of coupler determines an absolute position of coupler, e.g., the three dimensional coordinate of the coupler, e.g., the height coordinate, the depth coordinate, and the width coordinate of the coupler. The absolute position of the coupler may be a position relative to a real world origin point.

The controller 101 of the apparatus that provides trailer information 100 may be configured to control to guide the vehicle to the coupler based on at least one from among the information on the determined distance and the information on the identified position of the coupler of the trailer.

Figure 2:
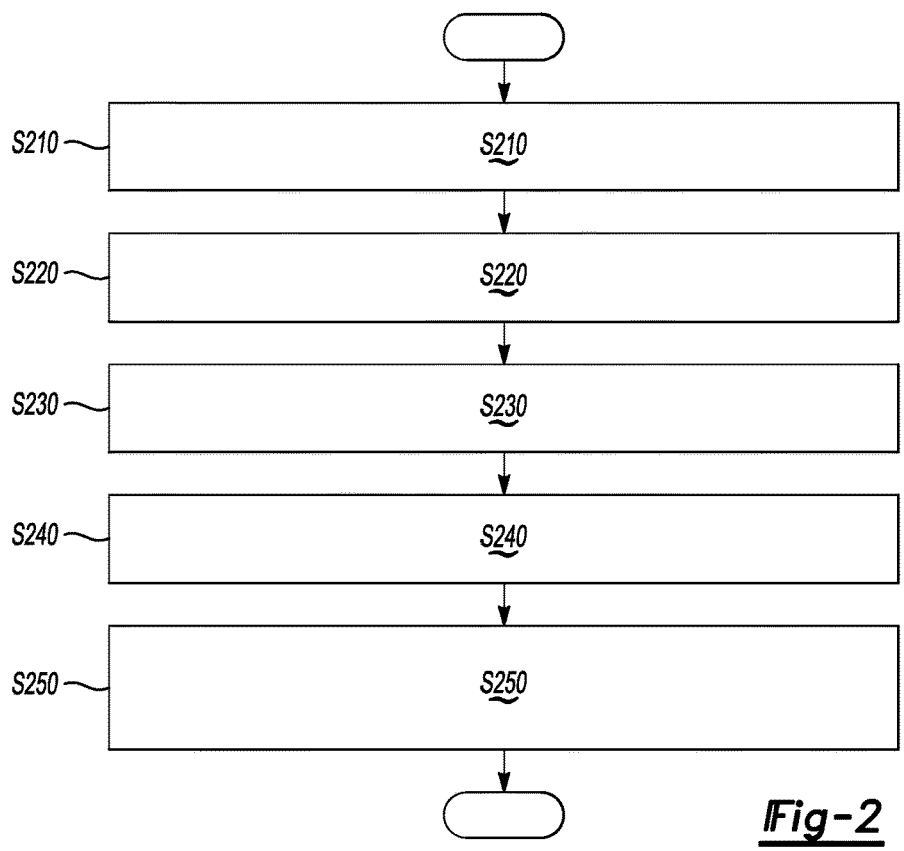
FIG. 2 shows a flowchart for a method of providing trailer information according to an exemplary embodiment.

FIG. 2 shows a flowchart for a method of providing trailer information according to an exemplary embodiment. The method of FIG. 2 may be performed by the apparatus that provides trailer information 100 or may be encoded into a computer readable medium as instructions that are executable by a computer to perform the method.

Referring to FIG. 2, an image taken by a rear-facing camera is received in operation S210. The coupler is identified in operation S220 by using a convolutional neural network for identifying couplers. The position of the identified coupler of the trailer in the image taken by the rear-facing camera is detected in operation S230. In operation S240, a distance between the detected position of the coupler of the trailer and the hitch of the vehicle is determined. Then, one or more from among information on the determined distance, information on the detected position of the coupler of the trailer, or information to guide the vehicle to the coupler may be displayed in operation S250.

Figure 3A:
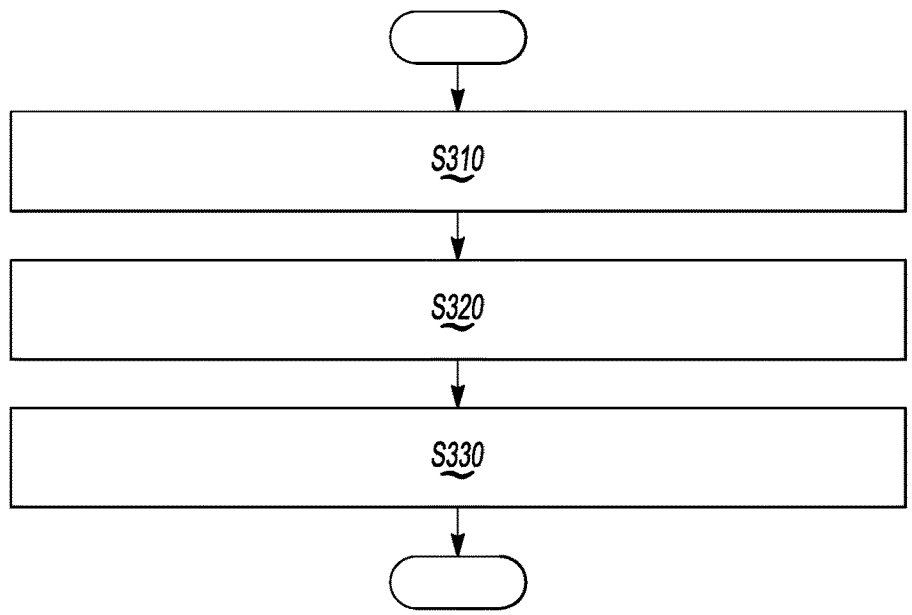
FIG. 3A shows a flowchart for a method of identifying and detecting a position of a coupler of a trailer in an image according to an aspect of an exemplary embodiment.

FIG. 3A shows a flowchart for a method of identifying and detecting a position of a coupler of a trailer in an image according to an aspect of an exemplary embodiment. The method of FIG. 3A may be performed by the apparatus that provides trailer information 100 or may be encoded into a computer readable medium as instructions that are executable by a computer to perform the method.

Referring to FIG. 3A, coordinates of a coupler are detected by using a convolutional neural network for identifying couplers in operation S310. The coupler may be identified by analyzing an image, identifying the coupler in the analyzed image and outputting a confidence score corresponding to the identified coupler. The imaged is analyzed by generating patches of an image (e.g., sub-samples of an image) based on an estimated distance between a rear-facing camera and a coupler.

In operation S320, N random patches are generated. Then, in operation S330, the N random patches are tested by using the plurality of convolutional neural networks to estimate the position of the coupler of the trailer. The plurality of convolutional neural network to estimate the position may be one or more from among a first convolutional neural network corresponding to a first distance that is closest to the rear-facing camera, a second convolutional neural network corresponding to a second distance that is further away from the rear-facing camera than the first distance, and a third convolutional neural network corresponding to a third distance that is in between the first distance and second distance.

Figure 3B:
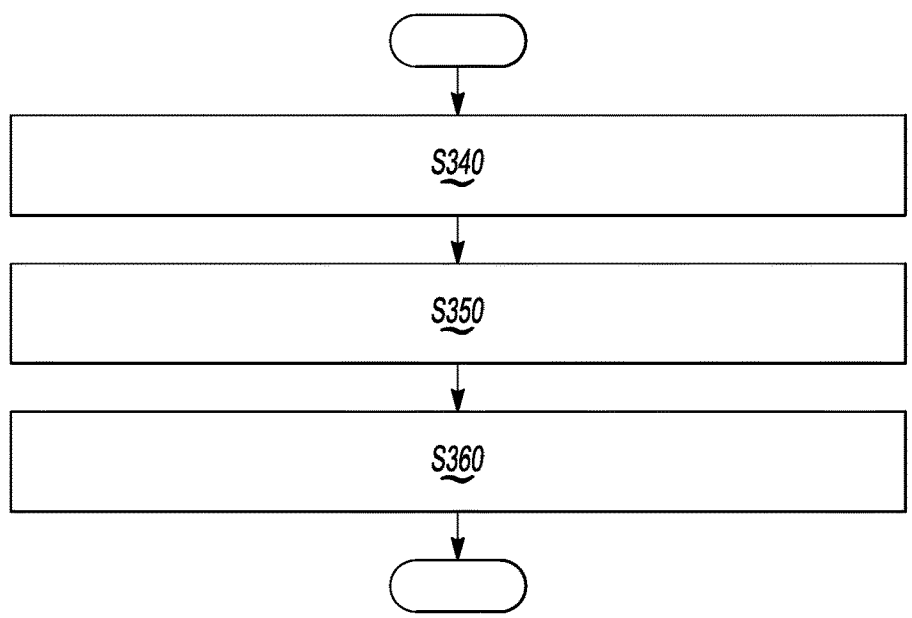
FIG. 3B shows a flowchart for a method of detecting a position of a coupler of a trailer in an image according to an aspect of an exemplary embodiment.

FIG. 3B shows a flowchart for a method of detecting a position of a coupler of a trailer in an image according to an aspect of an exemplary embodiment. The method of FIG. 3B may be performed by the apparatus that provides trailer information 100 or may be encoded into a computer readable medium as instructions that are executable by a computer to perform the method.

Referring to FIG. 3B, the contour points of the coupler in the image are estimated in operation S340 by using convolutional neural network for estimating contour. The geometry of the coupler is determined in operation S350. Then based on the geometry and the contour points, the height of the coupler is determined in operation S360. According to an example, the height of the coupler may be determined by extracting geometric features such as distances along straight lines and slopes of lines.

Figure 4:
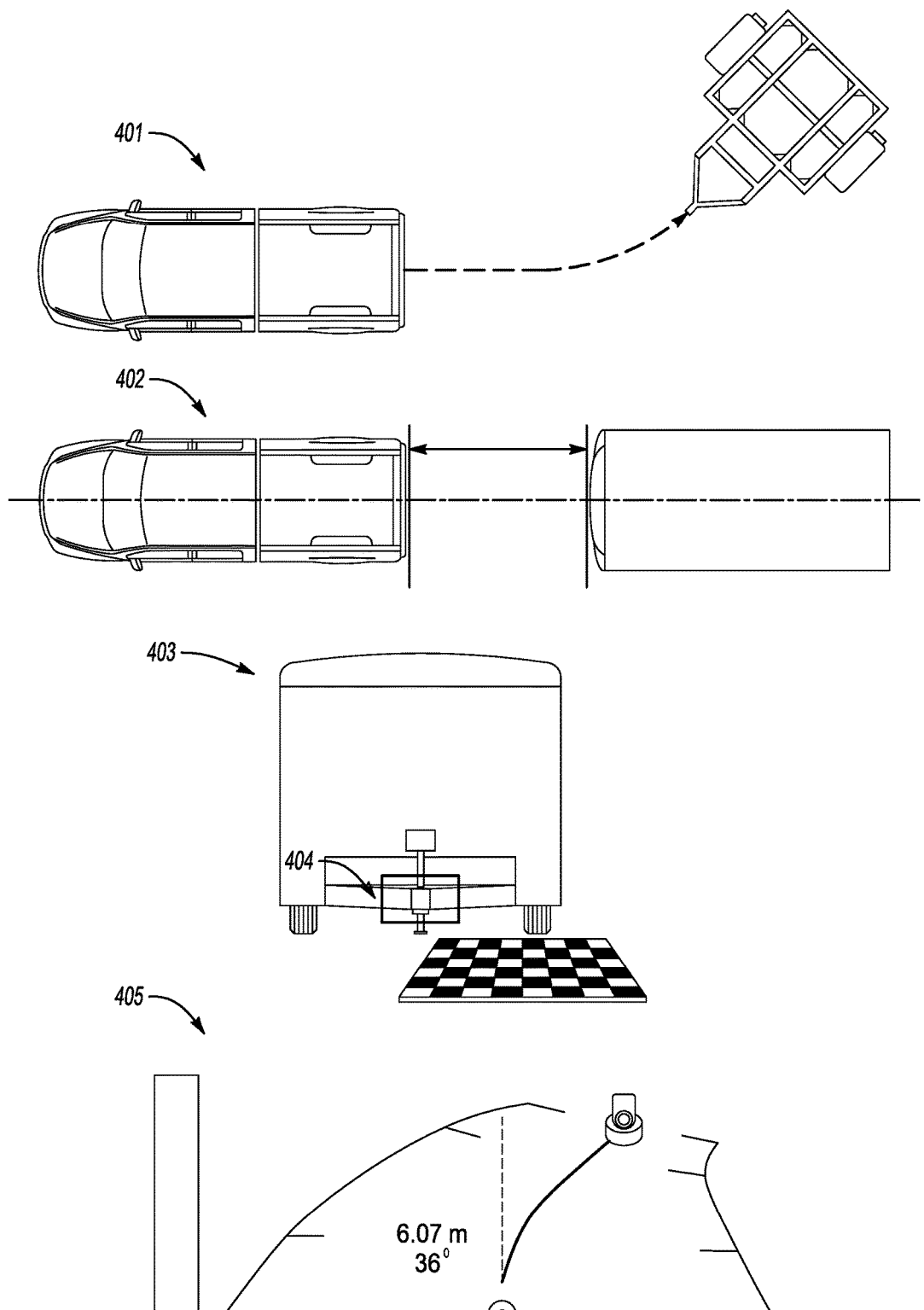
FIG. 4 shows illustrations of examples of visual assistance images displayable to an operator to assist with directing a vehicle to a trailer according to an aspect of an exemplary embodiment.

FIG. 4 shows illustrations of examples of visual assistance images displayable to an operator to assist with directing a vehicle to a trailer according to an aspect of an exemplary embodiment. The visual assistance images may be displayed on output 104, e.g., on a display visual from an interior of the vehicle.

Referring to FIG. 4, illustration 401 shows an example of guidance information in the form of an image that indicates a direction to move the vehicle to align the vehicle hitch with the trailer coupler. Illustration 402 shows an example of guidance information in the form of distance information that indicates a distance between the vehicle hitch and the trailer coupler.

Illustration 403 shows an example illustration of an image produced by a rear-facing camera 107. The image shows a trailer, a trailer coupler and a box 404 that indicates the location of the trailer coupler. The box 404 may be adjusted by an operator of the vehicle via the user input 106 to adjust the position of the box to better correspond to the location of the trailer coupler.

In addition, illustration 405 shows an example of guidance information and distance information. As shown in illustration 405, the distance between the coupler of the trailer and the hitch and the steering angle of the vehicle may be displayed. In addition, instructions indicating a target steering angle and a direction for the vehicle to align with the coupler may be displayed.

Figure 5:
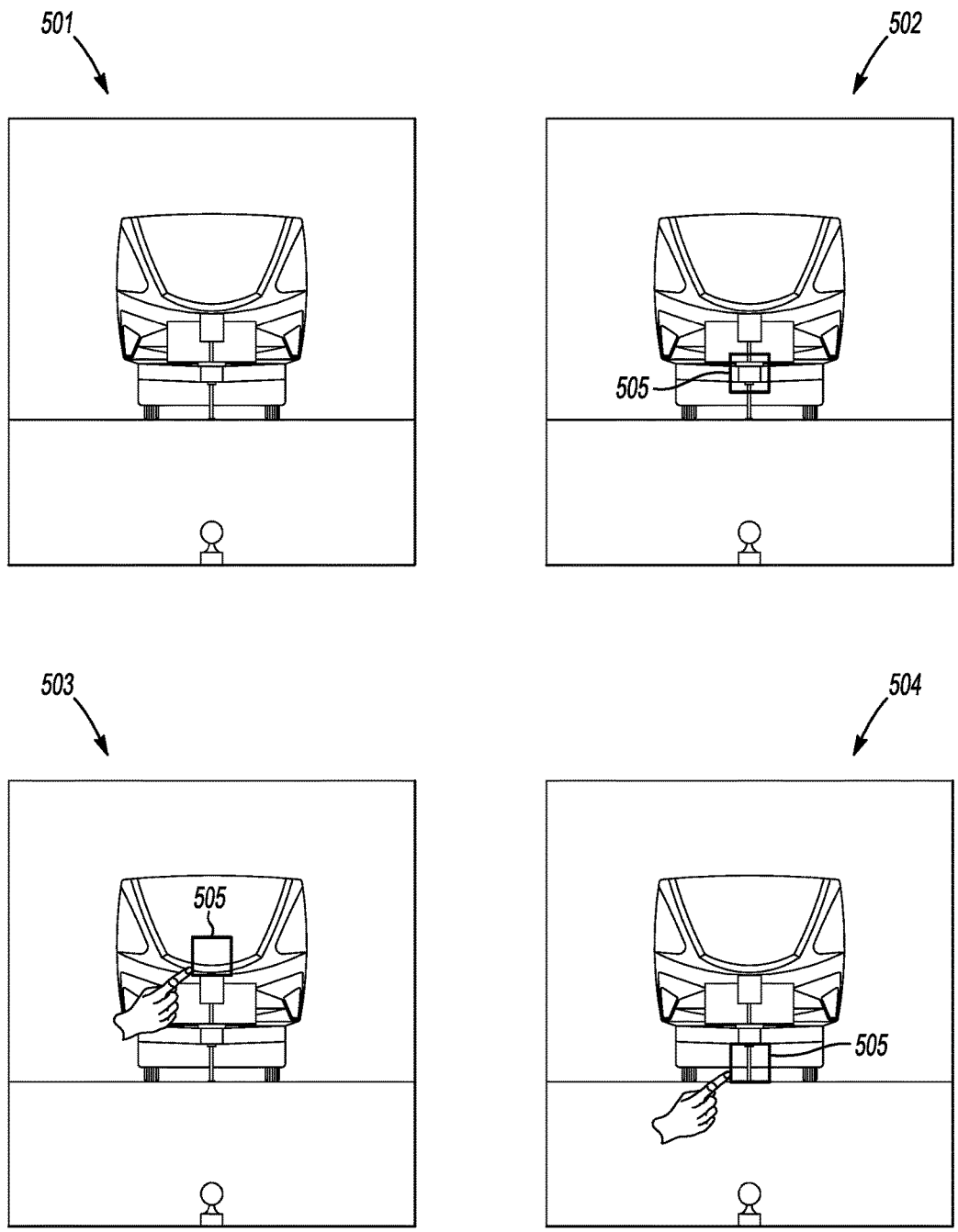
FIG. 5 shows illustrations of trailer coupler detection and an operator adjustment to a detected trailer coupler position according to an aspect of an exemplary embodiment.

FIG. 5 shows illustrations of trailer coupler detection and an operator adjustment to a detected trailer coupler position according to an aspect of an exemplary embodiment. Referring to FIG. 5, illustration 501 illustrate a typical image from a rear image camera 107 showing a hitch of a vehicle and a coupler of a trailer. Illustration 502 shows an example of detecting a coupler of the trailer accurately, where the box 505 accurately reflects the position of the coupler of the trailer. Illustration 503 shows an example where the detection of the coupler is inaccurate requiring an operator to move the box 505 to the location in the image corresponding to the position of the coupler as shown in illustration 504. The updated position may be used by apparatus that provides trailer information to better analyze the image from the rear-facing camera and correct the previously determined position of the coupler of the trailer.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for providing trailer coupler information, the method comprising:
receiving an image taken by a rear-facing camera;
identifying a coupler of a trailer in the received image;
detecting a position of the identified coupler of the trailer in the received image;
determining a distance between the detected position of the identified coupler of the trailer and a hitch of a vehicle; and
displaying at least one from among information on the determined distance, information on the detected position of the identified coupler of the trailer in the received image, and information to guide the vehicle to the identified coupler,
wherein the identifying the coupler of the trailer in the received image comprises detecting coordinates of the coupler by using a convolutional neural network for identifying a coupler, and
wherein the detecting the position of the identified coupler of the trailer in the received image comprises:
generating N random patches in the received image; and
testing the N random patches using a plurality of convolutional neural networks to estimate the position of the identified coupler of the trailer in the received image,
where N is a positive integer 2 or greater.

2. The method of claim 1, wherein the plurality of convolutional neural networks comprises a first convolutional neural network corresponding to a first distance that is closest to the rear-facing camera, a second convolutional neural network corresponding to a second distance that is further away from the rear-facing camera than the first distance, and a third convolutional neural network corresponding to a third distance that is in between the first distance and second distance.

3. The method of claim 2, wherein the detecting the position of the identified coupler of the trailer in the image further comprises:
estimating contour points of the identified coupler in the received image;
determining a geometry of the identified coupler;
based on the contour points and the geometry, determining a height of the identified coupler.

4. The method of claim 3, wherein the estimating contour points of the identified coupler comprises determining two-dimensional coordinates of edges of the identified coupler using a convolutional neural network for detecting a contour of a coupler.

5. The method of claim 4, further comprising determining an absolute position of the identified coupler based on the height and two-dimensional coordinates of the edges of the identified coupler.

6. The method of claim 1, further comprising: receiving a user input to adjust the position of the identified coupler of the trailer in the received image; and
based on the user input, re-detecting the position of the identified coupler of the trailer in the received image.

7. The method of claim 1, further comprising:
controlling to guide the vehicle to the identified coupler based on at least one from among the information on the determined distance and the information on the detected position of the identified coupler of the trailer in the received image.

8. A non-transitory medium comprising computer instructions executable to cause a processing device to perform the method of claim 1.

9. An apparatus for providing trailer coupler information, the apparatus comprising:
at least one memory comprising computer executable instructions; and
at least one processor configured to read and execute the computer executable instructions, the computer executable instructions causing the at least one processor to:
receive an image taken by a rear-facing camera;
identify a coupler of a trailer in the received image;
detect a position of the identified coupler of the trailer in the received image;
determine a distance between the detected position of the identified coupler of the trailer and a hitch of a vehicle; and
control to display at least one from among information on the determined distance, information on the detected position of the identified coupler of the trailer in the received image, and information to guide the vehicle to the identified coupler,
wherein the computer executable instructions cause the at least one processor to identify the coupler of the trailer in the received image by detecting coordinates of the coupler by using a convolutional neural network for identifying a coupler, and
wherein the computer executable instructions cause the at least one processor to detect the position of the identified coupler of the trailer in the received image by generating N random patches in the received image and testing the N random patches using a plurality of convolutional neural networks to estimate the position of the identified coupler of the trailer in the received image,
where N is a positive integer 2 or greater.

10. The apparatus of claim 9, wherein the plurality of convolutional neural networks comprises a first convolutional neural network corresponding to a first distance that is closest to the rear-facing camera, a second convolutional neural network corresponding to a second distance that is further away from the rear-facing camera than the first distance, and a third convolutional neural network corresponding to a third distance that is in between the first distance and second distance.

11. The apparatus of claim 10, wherein the computer executable instructions cause the at least one processor to detect the position of the identified coupler of the trailer in the received image by estimating contour points of the identified coupler in the image, determining a geometry of the identified coupler, and based on the contour points and the geometry, determining a height of the identified coupler.

12. The apparatus of claim 11, wherein the computer executable instructions cause the at least one processor to estimate contour points of the identified coupler by determining two-dimensional coordinates of edges of the identified coupler using a convolutional neural network for detecting a contour of a coupler.

13. The apparatus of claim 12, wherein the computer executable instructions cause the at least one processor to determine an absolute position of the identified coupler based on the height and two-dimensional coordinates of the edges of the identified coupler.

14. The apparatus of claim 9, wherein the computer executable instructions further cause the at least one processor to receive a user input to adjust the position of the identified coupler of the trailer in the received image; and based on the user input, re-detect the position of the identified coupler of the trailer in the received image.

15. The apparatus of claim 14, wherein the computer executable instructions cause the at least one processor to control to guide the vehicle to the identified coupler based on at least one from among the information on the determined distance and the information on the detected position of the identified coupler of the trailer in the received image.

16. A non-transitory computer readable medium comprising computer executable instructions executable by a processor to perform a method for providing trailer information, the method comprising:
detecting a position of a coupler of a trailer in an image taken by a rear-facing camera by using a convolutional neural network; and
determining a distance between the detected position of the coupler of the trailer and a hitch of vehicle,
wherein the detecting the position of the coupler of the trailer in the image taken by the rear-facing camera comprises:
detecting coordinates of the coupler of the trailer in the image by using the convolutional neural network for identifying the coupler;
generating N random patches in the image; and
testing the N random patches using a plurality of convolutional neural networks to estimate the position of the coupler of the trailer in the image,
where N is a positive integer 2 or greater.

17. The non-transitory medium of claim 16, wherein the method further comprises performing at least one from among:
controlling to guide the vehicle to the coupler of the trailer in the image based on at least one from among the information on the determined distance and the information on the detected position of the coupler of the trailer; and
displaying at least one from among information on the determined distance, information the detected position of the coupler of the trailer, and information to guide a vehicle to the coupler.

* * * * *